Oct. 20, 1970   R. V. MATHERS ET AL   3,534,982
FIFTH WHEEL

Filed Aug. 26, 1968   5 Sheets-Sheet 1

INVENTORS.
Robert V. Mathers
Charles P. DeLand
BY
Barnes, Dickey & Pierce
ATTORNEYS.

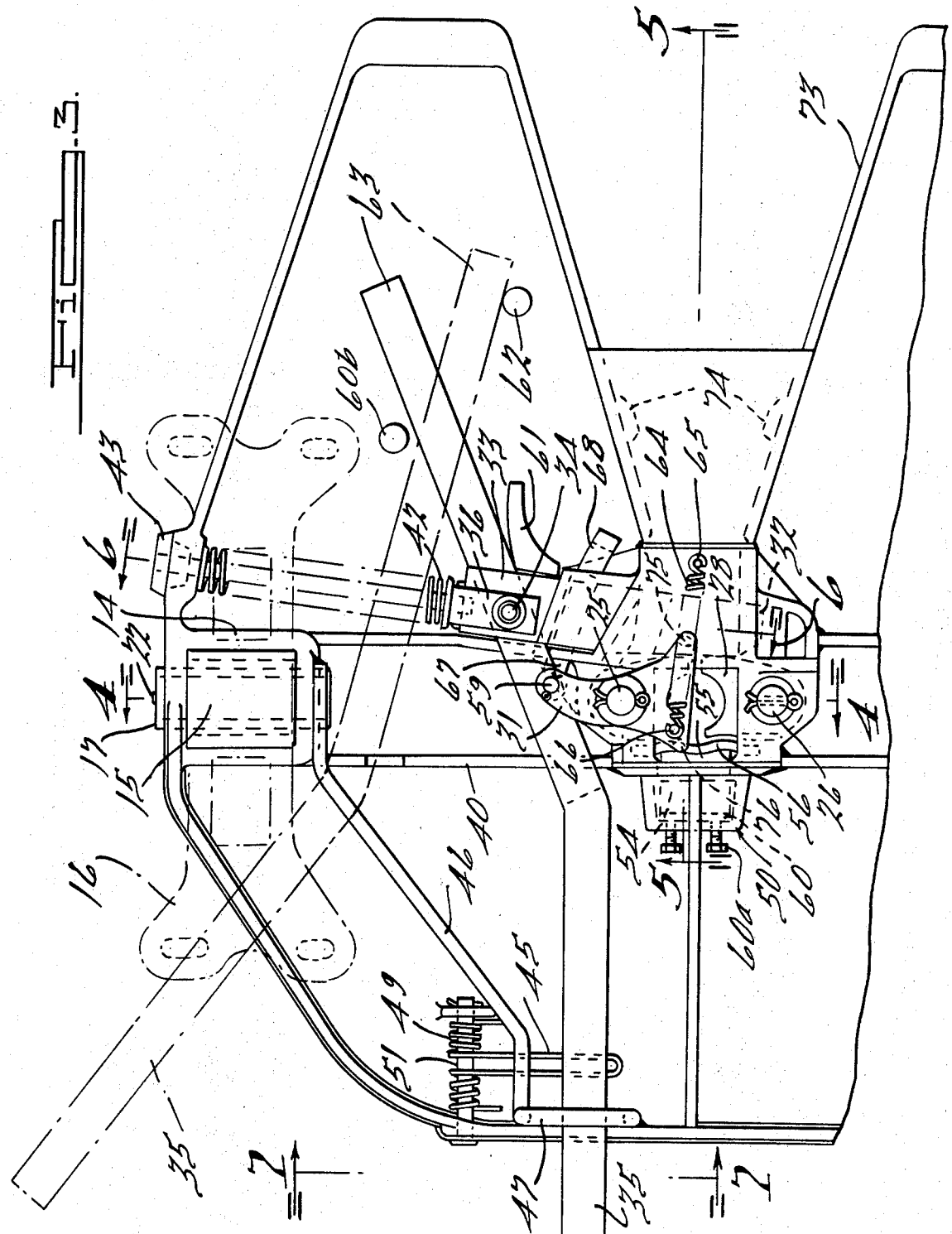

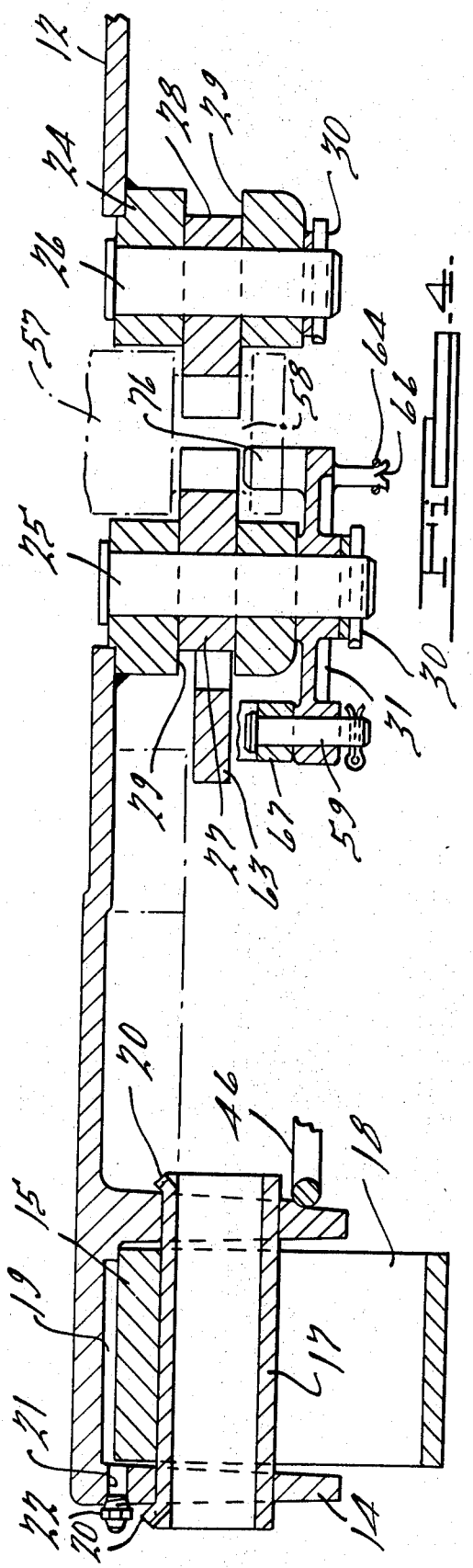

Oct. 20, 1970    R. V. MATHERS ET AL    3,534,982
FIFTH WHEEL
Filed Aug. 26, 1968    5 Sheets-Sheet 4
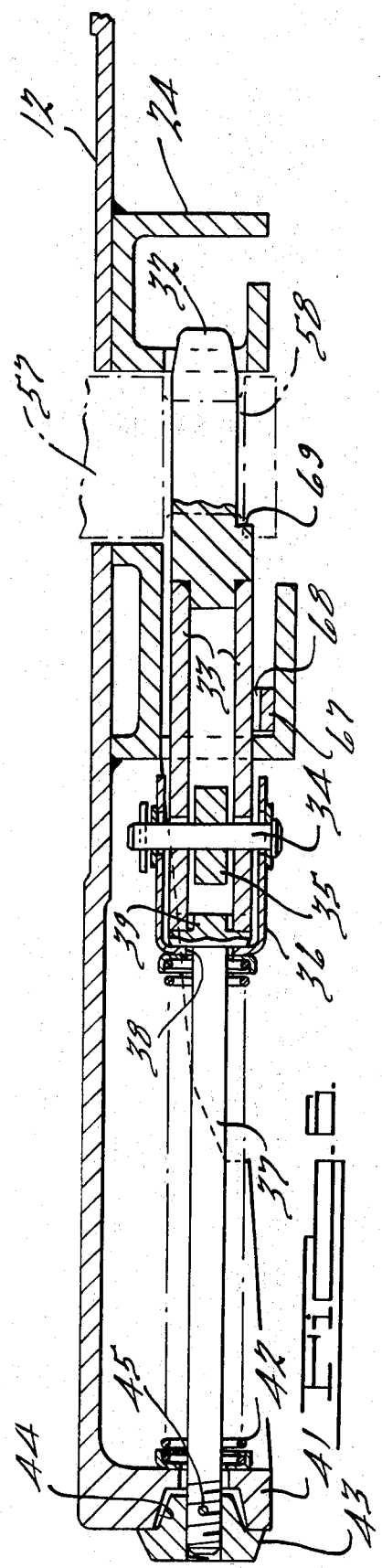
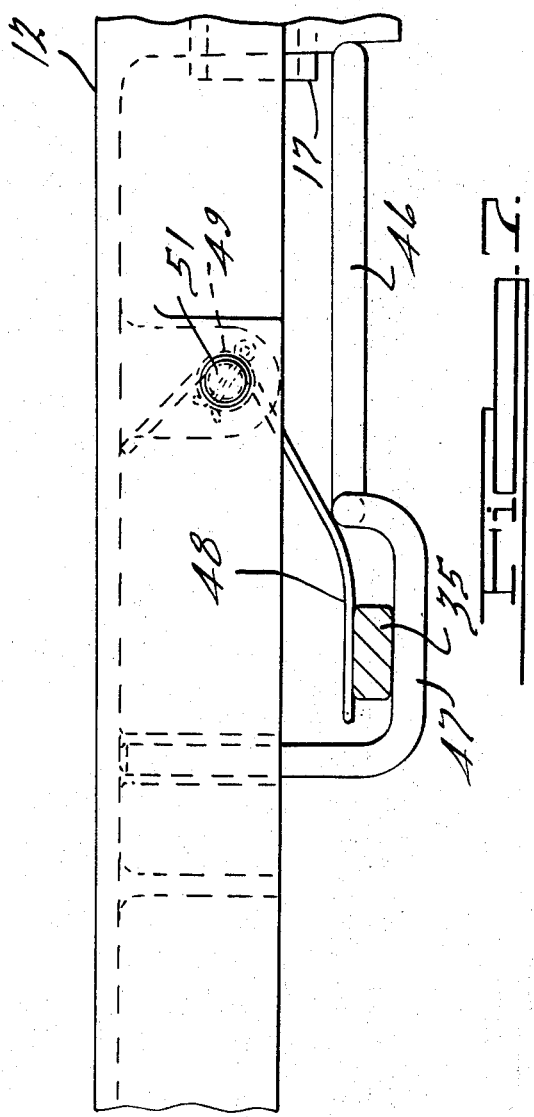
INVENTORS.
Robert V. Mathers,
Charles P. DeLand
BY
Harness, Dickey & Pierce
ATTORNEYS.

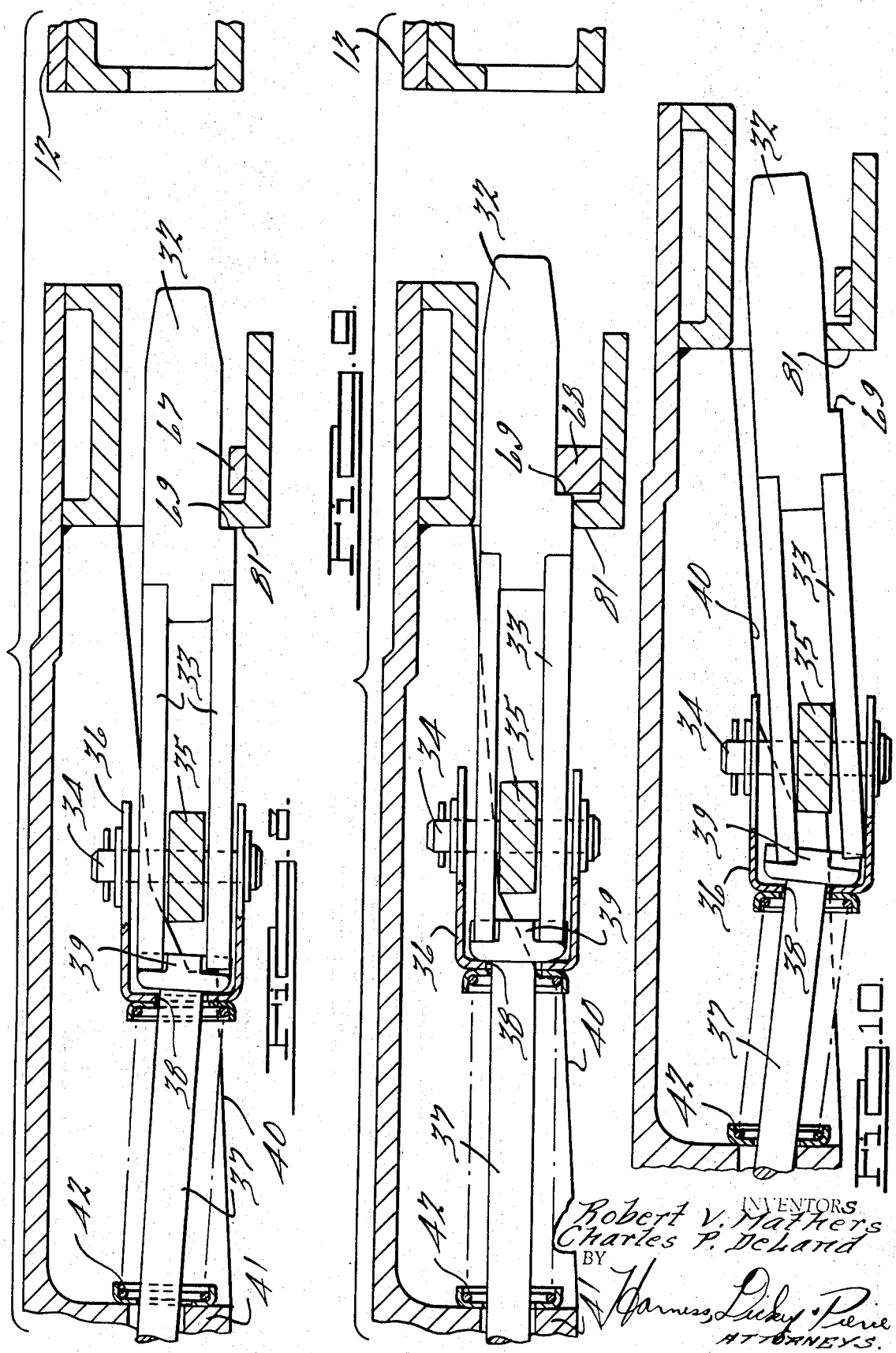

United States Patent Office 3,534,982
Patented Oct. 20, 1970

3,534,982
FIFTH WHEEL
Robert V. Mathers, Grosse Pointe Farms, and Charles P. De Land, Grosse Pointe Park, Mich., assignors to Fruehauf Corporation, Detroit, Mich., a corporation of Michigan
Filed Aug. 26, 1968, Ser. No. 755,251
Int. Cl. B62d 53/12
U.S. Cl. 280—435                                         14 Claims

ABSTRACT OF THE DISCLOSURE

The fifth wheel embodies a tiltable platform having a V-slot for guiding a kingpin. Pivoted side jaws engage the kingpin in approximately a 300° area with the kingpin abutting elastomeric blocks to take up slack and absorb shock. A retractable wedge engages the side jaws at the mouth of the slot being urged to locked position by a spring. A single lever rolls on a predetermined cam surface to provide a short and changing lever arm to permit a substantially uniform force for retracting the locking wedge from a latched position. A lever having a finger engaged by the kingpin when moved from the side jaws moves the wedge to a releasable latched or cocked position, and another finger on the lever is engaged by the kingpin, after entering and being properly positioned in the side jaws to trigger the release of the wedge which advances and locks the jaws in clamped position.

CROSS REFERENCE TO A RELATED APPLICATION

In the application of R. T. Fujioka et al., filed Mar. 28, 1968, Ser. No. 716,769, for "Fifth Wheel" and assigned to the assignee of the present invention, a somewhat similar fifth wheel as that of the present invention is illustrated, described and claimed and over which the present invention is an improvement.

BACKGROUND OF THE INVENTION

Reference may be had to Pat. No. 3,251,610 to Eugene Chosy issued May 17, 1966, for "Fifth Wheel" which was assigned to the assignee of the present invention.

SUMMARY OF THE INVENTION

The fifth wheel comprises a flanged casting having forwardly extending downwardly sloping sections which form a throat for the reception of a kingpin. Mounting feet are pivoted on opposite sides of the casting to permit it to tilt longitudinally of the tractor. A housing is provided within the casting having elastomeric blocks therein of different resiliency which are secured together and to an arcuate plate against which the upper large end of the kingpin abuts. On the center line is a pair of pivoted side jaws having facing cavities which engage over 300° of the surface of a cylindrical section of the kingpin. The entrance of the kingpin closes the side jaws which are locked by a spring pressed wedge when tripped by the kingpin. A lever which is connected to the wedge engages a cam surface of predetermined formation which provides an extremely short lever arm for initially moving the wedge from locked position and which progressively becomes longer until the wedge is latched in open position. Upon movement of the kingpin from the side jaws a wedge latch unlatches the wedge and retains it in open position. Upon the entrance of the kingpin into the jaws the wedge latch is tripped and the wedge is urged by the spring into locking position across the jaws.

BRIEF DESCRIPTION OF THE DRAWINGS

FIG. 3 is an enlarged broken bottom view of the structure illustrated in FIG. 1;

FIG. 4 is an enlarged broken sectional view of the structure illustrated in FIG. 3, taken on the line 4—4 thereof;

FIG. 5 is an enlarged broken sectional view of the structure illustrated in FIG. 3, taken on the line 5—5 thereof;

FIG. 6 is an enlarged broken sectional view of the structure illustrated in FIG. 3, taken on the line 6—6 thereof, with the wedge in side jaw locked position;

FIG. 7 is an enlarged broken sectional view of the structure illustrated in FIG. 3, taken on the line 7—7 thereof;

FIG. 8 is a view of the structure similar to that of FIG. 6 showing the wedge in withdrawn latched position;

FIG. 9 is a view of the structure of FIG. 8, with the wedge moved to releasable latched or cocked position, and FIG. 10 is a view of the structure illustrated in FIG. 8 showing the maximum position of withdrawal of the wedge.

DESCRIPTION OF THE PREFERRED EMBODIMENT

Figure 1:
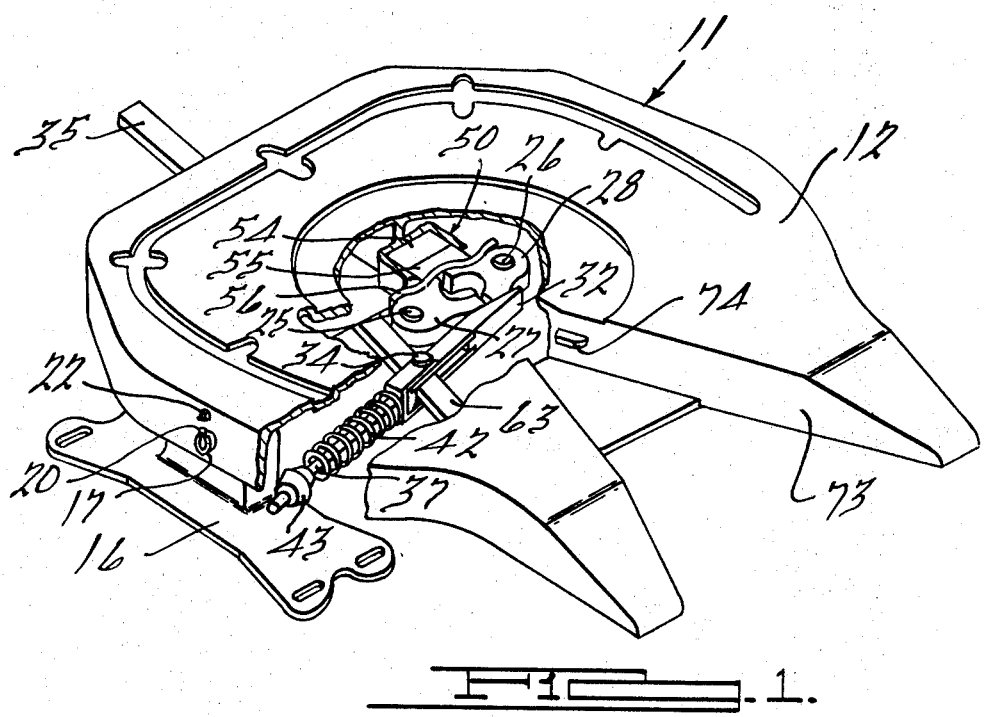
FIG. 1 is a broken perspective view of a fifth wheel of the present invention in kingpin locked position.
Figure 2:
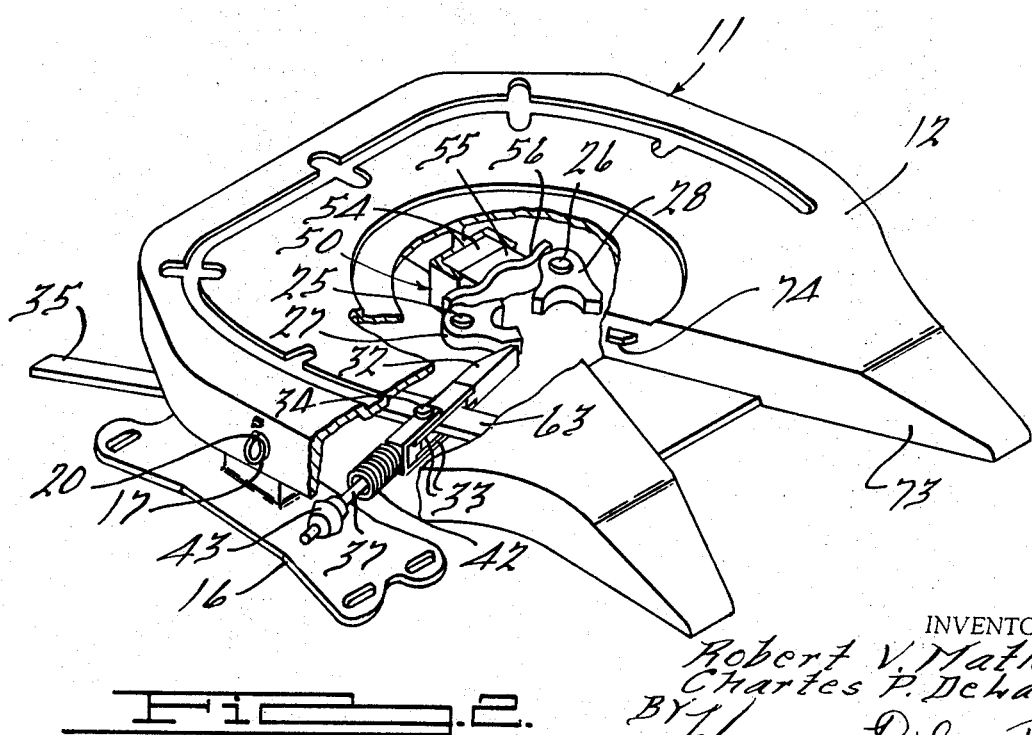
FIG. 2 is a view of the structure illustrated in FIG. 1, with the jaws in kingpin receiving position.

The fifth wheel 11 of the present invention embodies a flanged casting 12 the side flanges of which have oppositely disposed housings 14 for receiving bosses 15 on securing feet 16 retained in pivotal relation by a sleeve 17. As illustrated in FIG. 4, the sleeve 17 is secured within a slot 18 in the bosses 15 to engage the arcuate surface of a socket 19 within the housings 14 and pivot thereon and lubricated through an aperture 21 and fitting 22. The sleeve 17 has a pair of adjacent slots at each end leaving a tongue 20 which is deflectable outwardly as illustrated in FIG. 4, after the sleeve is installed to prevent it from shifting longitudinally.

A casting 24 is welded to the center of the casting 12 or may be one piece having apertures therethrough for receiving pins 25 and 26 which support side jaws 27 and 28 for pivotal movement. The jaws are disposed in slots 29 in the casting 24 and the pins are secured in position by a washer and a cotter pin 30 or other suitable means at the bottom end. The pin 25 supports a sensing trigger 31 which controls the release of a wedge 32, as will be explained hereinafter. The wedge 32 is longitudinally slidable within the casting 24 to a position, as illustrated in FIG. 1, where it locks the pivoted side jaws 27 and 28 in clamped position about the kingpin. The wedge not only locks the side jaws in closed position but also blocks the throat of the fifth wheel to allow a good distribution of loads and provide fail-safe kingpin retention.

The wedge has a pair of straps 33 extending rearwardly therefrom secured by a pivot 34 to a single operating lever 35. A clevis 36 is also secured on the pivot 34 with a rod 37 extending therefrom and through an aperture 38 in the web thereof. The web and ends of the straps 33 are also engaged by a head 39 on the rod. The apertures through the clevis 36 and the straps 33 are enlarged to provide a flexible joint between the wedge 32 and the rod 37. The rod 37 extends through the flange 41 of the casting 12 having a compression spring 42 thereabout for advancing the wedge into locked position. Initially when the wedge is in locking position a nut 43 is screwed upon the end of the rod until the wedge is located in a desired forward position when nested with the nut located in a recess 44 in the flange 41 and secured to the rod by a pin 45. The nut provides visual indication that the wedge is in locking position when located within the recess 44 and is the positive stop for locating the forwardmost position of the wedge. The universal movement between the straps 33, clevis 36 and head 39 permits a cam rib 40 engaged by the lever 35 to urge the wedge 32 downwardly relative to a wall 81 of the casting and a trigger link 67. The universal movement pemits the rod 37 and wedge 32 to assume the angular relation illustrated in FIG. 10 produced by the engagement of the lever 35 with the cam rib 40 at the end of the wedge withdraw movement of the lever. This provides assurance that a shoulder 69 on the wedge will engage the wall 81 of the casting after the lever is released and the spring 42 advances the wedge to the position illustrated in FIG. 8. A cam trigger 68 is actuated by the movement of the kingpin from the jaws to raise the wedge 32 and release it from the wall 81 and engage the shoulder 69 of the wedge to retain it in releasable cocked position, as illustrated in FIG. 9.

The lever 35 rides upon a rod 46 between locking and unlocked position, as illustrated in FIG. 3. When the wedge is in locked position, it is seated in a downwardly offset portion 47 of the rod and retained therein by an arm 48 of a double coil spring 49 secured on a pin 51. When the wedge is to be withdrawn, the lever 35 is raised upwardly out of the offset portion 47 and moved across the main portion of the rod 46. This retracts the wedge to its secured position and permits the tractor to pull forwardly and withdraw the kingpin from the jaws 27 and 28 which remain in open position.

An open faced box-like projection 50 is provided on the casting 24, as illustrated in FIG. 5. The projection 50 provides a recess 52 for an impact cushion element 53 made of a block 54 of a relatively hard elastomer and a block 55 forward thereof of a relatively soft elastomer. A sinuous plate 56 is disposed in front of the block 55 in position to be engaged by the body 57 of the kingpin 58. A plate 60 is disposed in rear of the block 54 engaged by a pair of screws 60a. The plates 56 and 60 and the block 55 and 54 can be left separate or can be bonded to each other in unit relationship. After the cushion element 53 is assembled within the recess 52 it can be initially deflected a short distance to maintain it in proper position by adjusting the screws 60a. Under preload conditions when the kingpin is engaged it will be deflected an additional distance. Most of this deflection will be taken by the block 54 which will fill the recess 52 and can no longer be moved. Under dynamic loading the block 55 will be deflected an additional distance, but will always maintain contact with the kingpin. This deflection will be taken by the block 55 since the block 54 can no longer be moved.

When the wedge is in closed position the lever 35 initially rolls around the cam surface, which is described by the instant centers of zero velocity of the lever system. This provides for no wear on the parts as the mechanical advantage changes. As the force lessens, the leverage decreases resulting in an almost constant lever pull for retracting the wedge. The cam surface of the cam pivot 61 substantially reduces the force required to withdraw the wedge 32 providing a substantially high leverage initially which progresses linearly through intermediate ratios of leverage in a more forward position of the lever along the cam surface. A substantially lower leverage is obtained near the end of the lever movement when the rearward end 63 thereof strikes a pin 62. A pin 60b limits the opposite movement of the inner end 63 of the lever 35.

The sensing trigger 31, as illustrated in FIG. 3, is shown in wedge released position in which it is retained by the kingpin when contacting a finger 76 extending upwardly from the trigger. A spring 64 has one end secured to a finger 65 on the casting 12 and the other end secured to a finger 66 on the sensing trigger 31. The kingpin is free to move from and through the jaws 27, 28 when the wedge is retained in full retracted position. In this relation, a shoulder 69 on the wedge 32 engages the wall 81 of the casting portion to lock the wedge in retracted position. The wedge is urged downwardly relative to the wall 81 as pointed out above by the action of the cam rib 40 on the lever 35. The rod 46 is so shaped as to permit the deflection of the lever 35 as it follows the cam rib surface. The rearward movement of the kingpin 58 strikes the finger 75 of the sensing trigger 31 and rotates it counterclockwise as illustrated in FIG. 3, assisted by the spring 64. This advances a link 67 secured by a pivot 59 to the trigger and a wedge end 68 thereof which passes under the wedge 32 and raises it sufficiently to disconnect the shoulder 69 from the wall 81 and upon the advancement of the wedge 32 by the spring 42 the shoulder 69 will engage the wedge end 68 and be retained thereby against further forward movement. The wedge end 68 is maintained in this position by the spring 64 and also by the friction between the shoulder 69 and wedge end 68 produced by the spring 42. This movement advances the finger 76 of the trigger 31 rearward in the path of movement of the kingpin when it is again moved within the side jaws 27 and 28. In this relationship the jaws are in open position to receive the kingpin and the wedge 32 is retained in releasable latched position by the wedge end 68.

A V-shaped throat 73 is provided at the rear end of the casting 12 through which the kingpin moves when it is to be secured by the side jaws 27 and 28. Guide elements 74, similar to those illustrated in the above set forth copending application, may be provided at the inner end of the throat to prevent entrance of the kingpin when too high or for lowering the kingpin to a proper level so that it can be properly inserted into the side jaws 27 and 28. Near the end of its advancement into the jaws, the kingpin will strike the finger 76 of the sensing trigger 31 and rotate it clockwise as viewed in FIG. 3. This moves the wedge end 68 of the link 67 from engagement with the shoulder 69 of the wedge 32 to permit the wedge to be driven forwardly by the spring 42 to lock the jaws in secured position about the recessed body portion of the kingpin. The soft elastomer block 54 holds the kingpin against the arcuate surfaces of the side jaws which not only automatically compensates for jaw wear but also accommodates worn kingpins and eliminates any slack in the coupling under all conditions. The advancement of the wedge 32 by the spring 42 returns the lever 35 to secured position in the offset portion 47 beneath the arm 48 of the spring 49.

THE OPERATION

When it is desired to disconnect the tractor from the trailer, the operator grasps the lever 35, raises it out of the offset portion 47 and moves it along the rod 46 to the dot and dash line position of FIG. 3. The inner end 63 of the lever rolls along the cam surface of the cam pivot 61 breaking the wedge 32 from its locked position and withdrawing it with a substantially uniform applied force due to the changing leverage on the cam surface until the shoulder 69 of the wedge 32 is forced downwardly by the sliding on the lever along the cam rib 40. The flexible connection of the rod 37 to the wedge 32 and the movement caused by the eccentric load coming from spring 42 through the head 39 into the top strap 33 permits the shoulder 69 to engage the wall 81 when the lever is released after it pulled the wedge shoulder 69 therebeyond as illustrated in FIGS. 8 and 10, respectively. The shoulder 69 will abut the surface and the wedge 32 will be retained retracted, as illustrated in FIG. 8. The driver may then enter the cab and drive the tractor forwardly to withdraw the kingpin from engagement with the side jaws 27 and 28. As the body 57 of the kingpin passes from the jaws 27 and 28, it will release the finger 76 and strike the finger 75 of the sensing trigger 31 and move the sensing trigger counterclockwise as illustrated in FIG. 3, assisted by the spring 64. The link 67 is moved with the trigger 31 and the wedge end 68 thereof passes beneath the wedge 32 which will be raised thereby and advanced forwardly by the compression of the spring 42. This releases the shoulder notch 69 from the wall 81 and advances it into engagement with the wedge end 68 which maintains the wedge 32 in releasable retracted position. The side jaws 27 and 28 are maintained in open position by the force in the elastomer block 54 acting through the block 55 and plate 56.

When it is desired to couple a tractor with a trailer, it is maneuvered to have the kingpin enter the throat 73 and if properly located will move into engagement with the side jaws 27 and 28 which close thereabout. The body of the kingpin will strike the tip of the jaw 27 which in turn pushes the wedge 32 as the kingpin passes thereby to loosen the wedge if secured by dirt, rust or ice to make sure it is free to advance. The final movement of the kingpin causes the body 57 to strike the finger 76 and rotate the sensing trigger 31 clockwise, as illustrated in FIG. 3, moving the wedge end 68 from, engagement with the shoulder 69 of the wedge 32 which is now free to be moved forwardly by the compression of the spring 42 across the outer surfaces of the isde jaws to clamp them in kingpin secured position, as illustrated in FIGS. 3 and 6. The forward movement of the wedge 32 is stopped by the nut 43 and should the nut extend outwardly from the side flange of the casting 12, visual indication is provided that the wedge did not properly seat and lock the jaws about the kingpin. The link 67 and the wedge end 68 will be maintained in the position illustrated in FIG. 3, by the engagement of the body 57 of the kingpin 58 with the finger 76 of the trigger 31 against the tension in the spring 64. The wedge 32 is always biased forwardly and provides a "fail safe" feature for securely locking the side jaws in kingpin engaged position.

What is claimed is:

1. In a fifth wheel, a platform having a throat for the reception of the kingpin, pivotal supports for said platform, a pair of jaws pivoted on said platform aligned with said throat and having facing recesses when in closed position, a wedge movable across the outer face of the jaws when in closed position, a rod on said wedge, a spring through which said rod extends for moving said wedge to locking position, a lever for retracting said wedge, means for retaining said wedge in fixed retracted position, and trigger means having a finger located adjacent to said jaws in position to be actuated by the kingpin when moving from said jaws for releasing said wedge from fixed retracted position and retaining it in releasable retracted position.

2. In a fifth wheel as recited in claim 1, wherein said trigger means has a second finger thereon located adjacent to said jaws and engageable by the kingpin near the end of its movement thereinto for moving said trigger means and releasing the wedge from its releasable retracted position.

3. In a fifth wheel as recited in claim 1, wherein said lever is pivoted to said wedge, and a cam pivot adjacent to said lever pivot having a cam surface engaged by the lever which changes the lever arm thereof as the wedge is withdrawn to substantially reduce the initially and subsequent applied force required for withdrawing the wedge.

4. In a fifth wheel as recited in claim 3, wherein stop means is provided for the inner end of the lever remote from said cam pivot for substantially decreasing the lever arm near the end of the withdrawal movement of the wedge.

5. In a fifth wheel as recited in claim 4, wherein a second stop means limits the movement of the inner end of the lever when the lever is moved to wedge locked position.

6. In a fifth wheel as recited in claim 1, wherein a cushion element is supported adjacent to the side of the jaws opposite of that engaged by the wedge for urging the jaws to open position and to provide initial pressure between the jaws and kingpin.

7. In a fifth wheel as recited in claim 6, wherein adjustable means is provided adjacent to the cushion element by which a coupling force of desired value is applied to the cushion element.

8. In a fifth wheel as recited in claim 6, wherein the cushion element embodies a block of elastomeric material in engagement with a sinuously formed plate, and supporting means on said platform for encompassing said block and locating the plate in position to be engaged by the kingpin and jaws.

9. In a fifth wheel as recited in claim 8, wherein the cushion material is formed from two blocks of elastomeric material having different hardnesses, the softer of which is confined under a preload the other of which absorbs any substantial shock occurring between the kingpin and platform after the softer block is confined.

10. In a fifth wheel as recited in claim 1, wherein the wedge is secured to the rod in a manner to provide free movement therebetween, and wherein said wedge has a shoulder which engages a wall of the platform when in retracted position, and a cam track on the platform for deflecting the wedge against said wall to assure engagement of the shoulder therewith upon the release of the wedge from retracted position.

11. In a fifth wheel as recited in claim 10, wherein said trigger means has an end which releases said wedge from its retracted position and engages the shoulder thereof to retain the wedge in releasable retracted position when the kingpin positively actuates the trigger means upon the movement of the kingpin from the jaws.

12. In a fifth wheel as recited in claim 11, wherein said trigger means has a pivotally mounted body with the fingers extending upwardly toward said jaws, and said end is pivoted to said body and shaped to release said wedge and engage the shoulder thereof.

13. In a fifth wheel as recited in claim 10, wherein said trigger means has a second finger which is engaged by the kingpin upon its movement into the jaws to move the trigger means and to release the shoulder and permit the spring to advance the wedge into engagement with the jaws.

14. In a fifth wheel as recited in claim 13, wherein the end of the wedge is in the path of movement of the kingpin and is struck thereby when advancing into the jaws for retracting and freeing the wedge before it is thereafter released.

References Cited
UNITED STATES PATENTS

| | | | |
|---|---|---|---|
| 1,981,233 | 11/1934 | Harris | 280—434 |
| 2,610,069 | 9/1952 | Ketel | 280—434 |
| 2,772,895 | 12/1956 | Steeves et al. | 280—435 X |
| 3,251,609 | 5/1966 | Daniels | 280—434 |
| 3,251,610 | 5/1966 | Chosy | 280—435 |
| 3,352,571 | 11/1967 | Nelson | 280—435 |

LEO FRIAGLIA, Primary Examiner

U.S. Cl. X.R.

280—439